Patented Sept. 19, 1944

2,358,717

UNITED STATES PATENT OFFICE 2,358,717

VULCANIZATION OF RUBBER

Paul C. Jones, Silver Lake, Ohio, assignor to The B. F. Goodrich Company, New York, N. Y., a corporation of New York No Drawing. Application December 14, 1942, Serial No. 468,983

18 Claims. (Cl. 260—785)

This invention relates to a new method for the vulcanization of natural or synthetic rubber and to the product obtained thereby. It pertains more specifically to the vulcanization of a rubber in the presence of a metallic salt of a 2-mercaptothiazoline under conditions such that no free metallic oxide remains in the rubber composition after vulcanization.

It is well known that various metallic salts of 2-mercaptothiazoline and its homologues are active accelerators of vulcanization; however, in the past these compounds have always been used in the presence of an activating metallic oxide. The metallic oxides which activate salts of 2-mercaptothiazolines are well known; broadly speaking, they are the same as the metallic oxides which activate mercapto accelerators generally. The activating effect of the various metallic oxides has been described by Cotton et al., Rubber Chemistry and Technology 11, 331 (1938), and by others. Typical examples of those oxides which are effective are litharge, red lead, cadmium oxide, zinc oxide, mercuric oxide, and bismuth trioxide.

It has also been found that various monocarboxylic acids and their metallic salts exert an activating effect upon 2 - mercaptothiazoline salts; among the acids which may be used are stearic, lauric, caprylic, linoleic, linolenic, oleic, benzoic, salicylic, and the like. The amounts of activating metallic oxides and of monocarboxylic acids or salts used range from about 1.0 to about 5.0 per cent, based on the rubber. Heretofore, however, sufficient metallic oxide has been used so that an appreciable quantity of the oxide has remained in the rubber composition after vulcanization, even though a portion of it may have reacted with the monocarboxylic acid present.

I have now discovered that rubber compositions having greatly increased abrasion resistance may be prepared by vulcanizing a rubber in the presence of a metal salt of a 2-mercaptothiazoline, and in the presence of either a metallic salt of a monocarboxylic acid, or in the presence of a mixture of monocarboxylic acid and no more than the stoichiometric amount of an activating metallic oxide sufficient to react with the monocarboxylic acid or other acidic material present. Rubber compositions vulcanized in accordance with this procedure contain no metallic oxide after vulcanization, any oxide present reacting with the acid to produce a metal soap. These rubber compositions have a much higher abrasion resistance than similar vulcanized rubber compositions containing even small amounts of free metallic oxides. Although, as stated above, a variety of monocarboxylic acids may be used, it is preferred to use the fatty acids, particularly the saturated fatty acids containing five or more carbon atoms, such as lauric, stearic, oleic, or the like.

Although a variety of metal salts of 2-mercaptothiazolines may be used, the preferred class includes the salts of those metals which form activating oxides, as described above. Among the 2-mercaptothiazolines the salts of which may be used are 2-mercaptothiazoline
2-mercapto-4-methylthiazoline
2-mercapto-5-methylthiazoline
2-mercapto-4,4-dimethylthiazoline
2-mercapto-4,5-dimethylthiazoline
2-mercapto-5,5-dimethylthiazoline
2-mercapto-4-ethylthiazoline
2-mercapto-4-butylthiazoline
2-mercapto-4-methyl-5-butylthiazoline
2-mercapto-4-phenylthiazoline
2-mercapto-4-benzylthiazoline
2-mercapto-4-betahydroxyethylthiazoline
2-mercapto-4-chlormethylthiazoline
2-mercapto-4-betachlorethylthiazoline
2-mercapto-4-hydroxythiazoline
2-mercapto-4-methoxymethylthiazoline
2-mercapto-4-aminothiazoline
2-mercapto-4-(p-aminophenyl) thiazoline
2-mercapto-4-anisylthiazoline
2-mercapto-5-chlorothiazoline
2-mercapto-5-hydroxythiazoline
2-mercapto-5-aminothiazoline
2-mercapto-4,5-tetramethylenethiazoline and other similar compounds.

The metallic ions of the mercaptothiazoline salt, of the monocarboxylic acid salt, and of the metallic oxide need not be identical. Two or more different activating metallic oxides may be used in the same rubber composition, and in some cases superior results may be obtained by using such a mixture. Although, as has been stated, a monocarboxylic acid and not more than the stoichiometrically equivalent amount of metallic oxide may be separately incorporated into the rubber, it is usually preferable to add the two materials in their combined form, that is, as the metal salt or soap of the acid.

My new process may be used not only with natural rubber or caoutchouc, but also with any rubber material which may be vulcanized with sulfur, such as balata, gutta percha, reclaimed rubber, artificial rubber isomers, latex, and copolymers of butadiene and dimethylbutadiene with other copolymerizable ethylenic monomers such as styrene, methyl acrylate, methyl methacrylate, isobutylene, or acrylonitrile, and the term "a rubber" is used in the claims to designate all the aforementioned materials.

In order more clearly to illustrate my invention, I shall describe specific examples. The invention, however, is not intended to be limited to the details of these specific examples.

Rubber stocks were compounded comprising, in parts by weight,

*Example I*

|  | A | B | C |
|---|---|---|---|
| Rubber (smoked sheets) | 100.0 | 100.0 | 100.0 |
| Carbon black | 53.0 | 53.0 | 53.0 |
| Antioxidant | 1.0 | 1.0 | 1.0 |
| Sulfur | 1.5 | 1.5 | 1.5 |
| Pine tar | 4.0 | 4.0 | 4.0 |
| Zinc oxide | 0.0 | 0.75 | 3.5 |
| Zinc stearate | 5.0 | 5.0 | 5.0 |
| Zinc salt of 2-mercaptothiazoline | 2.0 | 2.0 | 2.0 |

The rubber stocks so compounded were vulcanized in a press for 75 minutes at 265° F., the resultant stocks having a tensile strength of about 3900 to 4200 pounds per square inch and an ultimate elongation of 575 to 600%. The samples were then tested on a Williams abrasion machine with the following results, the index in all cases being relative to a standard rubber tire tread stock having an index of 1000.

|  | Stock | | |
|---|---|---|---|
|  | A | B | C |
| Index | 1,557 | 1,174 | 1,087 |

As is clear from this table, the stock (A) which contained no free zinc oxide after vulcanization, was 38% more resistant to abrasion than the best stock containing zinc oxide. Even as little as 0.75 part of zinc oxide (B) had a deleterious effect on abrasion resistance.

*Example II*

The following series of rubber compositions was prepared:

|  | D | E | F | G |
|---|---|---|---|---|
| Rubber (smoked sheets) | 100.0 | 100.0 | 100.0 | 100.0 |
| Carbon black | 53.0 | 53.0 | 53.0 | 53.0 |
| Antioxidant | 1.0 | 1.0 | 1.0 | 1.0 |
| Sulfur | 2.0 | 2.0 | 2.0 | 2.0 |
| Pine tar | 4.0 | 4.0 | 4.0 | 4.0 |
| Zinc oxide | 0.0 | 0.65 | 3.5 | 0.75 |
| Stearic acid | 0.0 | 4.5 | 5.0 | 0.0 |
| Zinc stearate | 5.0 | 0.0 | 0.0 | 5.0 |
| Zinc salt of 2-mercaptothiazoline | 2.0 | 2.0 | 2.0 | 2.0 |

The foregoing rubber compositions were vulcanized in a press for 75 minutes at 265° F. The samples thus obtained were then aged 10 days in a Geer oven at 70° C. and the aged samples were tested on a Williams agrasion machine with the following results:

|  | Sample | | | |
|---|---|---|---|---|
|  | D | E | F | G |
| Index | 1,483 | 1,513 | 1,162 | 1,295 |

The index in each case is relative to a standard rubber tread stock taken as 1000.

The data clearly show the great superiority in abrasive resistance of the two stocks (D and E) which contained no free zinc oxide after vulcanization. (The zinc oxide in E is the stoichiometric quantity necessary to react with the stearic acid.) These results also show that the superior properties of my new compositions are not transitory, but remain even after exposure to severe aging condition.

Similar results may be obtained with other rubbers, particularly copolymers of butadiene with styrene. Other metallic salts may also be used, particularly cadmium salts, although zinc salts are generally preferred.

The precise order in which the ingredients are added to my new rubber compositions is of no particular importance. Any of the usual pigments, fillers, reinforcing agents, softeners, antioxidants, or other accelerators may also be present in the rubber composition.

It should be noted that the fatty acid is not the only acidic material present in the foregoing compositions which is capable of reacting with the zinc oxide to form a compound which is compatible with the rubber. The pine tar used as softener, having an acid value of 50 to 60, is capable of reacting with the zinc oxide in the ratio of 1 to 0.08. Amounts of activating metallic oxide, therefore, up to the stoichiometric amount which will react with the organic acidic ingredients of the rubber composition may be present before vulcanization. Such a composition will contain no free metallic oxide after vulcanization and will possess a superior abrasive resistance.

The superior abrasive resistance of my new compositions render them particularly valuable for use in tire treads or in conveyor belts, although they have many other uses where abrasive resistance is important.

Although I have described specific embodiments of my invention, I do not intend to limit myself solely thereto, but to include equivalent modifications within the scope of the appended claims.

I claim:

1. The method of vulcanizing a rubber which comprises heating a rubber in the presence of a metallic salt of a 2-mercaptothiazoline, and in the presence of a member of the class consisting of monocarboxylic acids and their salts with metals capable of forming activating oxides, and in the absence of more than the stoichiometric amount of activating metallic oxides sufficient to react with the acidic constituents of the composition during its vulcanization.

2. The method of vulcanizing a rubber which comprises heating a rubber in the presence of a salt of a 2-mercaptothiazoline with a metal capable of forming an activating oxide, and in the presence of a salt of a monocarboxylic acid with a metal capable of forming an activating oxide, and in the absence of activating metallic oxides.

3. The method of vulcanizing a rubber which comprises heating a rubber in the presence of a salt of a 2-mercaptothiazoline with a metal capable of forming an activating oxide, and in the presence of a monocarboxylic acid, and in the presence of no more than the stoichiometric amount of activating metallic oxides sufficient to react with the acidic constituents of the composition during its vulcanization.

4. The method of vulcanizing a rubber which comprises heating a rubber in the presence of a salt of a 2-mercaptothiazoline with a metal capable of forming an activating oxide, and in the presence of a salt of a fatty acid with a metal capable of forming an activating oxide, and in the absence of activating metallic oxides.

5. The method of vulcanizing a rubber which comprises heating a rubber in the presence of a salt of a 2-mercaptothiazoline with a metal capable of forming an activating oxide, and in the presence of a fatty acid, and in the presence of no more than the stoichiometric amount of activating metallic oxides sufficient to react with the acid constituents of the composition during its vulcanization.

6. The method of vulcanizing rubber which comprises heating rubber in the presence of a salt of a 2-mercaptothiazoline with a metal capable of forming an activating oxide, and in the presence of a salt of a fatty acid with a metal capable of forming an activating oxide, and in the absence of activating metallic oxides.

7. The method of vulcanizing rubber which comprises heating rubber in the presence of a salt of a 2-mercaptothiazoline with a metal capable of forming an activating oxide, and in the presence of a fatty acid, and in the presence of no more than the stoichiometric amount of activating metallic oxides sufficient to react with the acidic constituents of the composition during its vulcanization.

8. The method of vulcanizing a rubber which comprises heating a rubber in the presence of the zinc salt of a 2-mercaptothiazoline, and in the presence of a salt of a fatty acid with a metal capable of forming an activating oxide, and in the absence of activating metallic oxides.

9. The method of vulcanizing a rubber which comprises heating a rubber in the presence of the zinc salt of a 2-mercaptothiazoline, and in the presence of a fatty acid, and in the presence of no more than the stoichiometric amount of activating metallic oxides sufficient to react with the acidic constituents of the composition during its vulcanization.

10. A composition comprising a rubber vulcanized in the presence of a metallic salt of a 2-mercapto thiazoline, and in the presence of a member of the class consisting of monocarboxylic acids and their salts with metals capable of forming activating oxides, and in the absence of more than the stoichiometric amount of activating metallic oxides sufficient to react with the acidic constituents of the composition during its vulcanization.

11. A composition comprising a rubber vulcanized in the presence of a salt of a 2-mercaptothiazoline with a metal capable of forming an activating oxide, and in the presence of a salt of a monocarboxylic acid with a metal capable of forming an activating oxide, and in the absence of activating metallic oxides.

12. A composition comprising a rubber vulcanized in the presence of a salt of a 2-mercaptothiazoline with a metal capable of forming an activating oxide, and in the presence of a monocarboxylic acid, and in the presence of no more than the stoichiometric amount of activating metallic oxides sufficient to react with the acidic constituents of the composition during its vulcanization.

13. A composition comprising a rubber vulcanized in the presence of a salt of a 2-mercaptothiazoline with a metal capable of forming an activating oxide, and in the presence of a salt of a fatty acid with a metal capable of forming an activating oxide, and in the absence of activating metallic oxides.

14. A composition comprising a rubber vulcanized in the presence of a salt of a 2-mercaptothiazoline with a metal capable of forming an activating oxide, and in the presence of a fatty acid, and in the presence of no more than the stoichiometric amount of activating metallic oxides sufficient to react with the acid constituents of the composition during its vulcanization.

15. A composition comprising rubber vulcanized in the presence of a salt of a 2-mercaptothiazoline with a metal capable of forming an activating oxide, and in the presence of a salt of a fatty acid with a metal capable of forming an activating oxide, and in the absence of activating metallic oxides.

16. A composition comprising rubber vulcanized in the presence of a salt of a 2-mercaptothiazoline with a metal capable of forming an activating oxide, and in the presence of a fatty acid, and in the presence of no more than the stoichiometric amount of activating metallic oxides sufficient to react with the acidic constituents of the composition during its vulcanization.

17. A composition comprising a rubber vulcanized in the presence of the zinc salt of a 2-mercaptothiazoline, and in the presence of a salt of a fatty acid with a metal capable of forming an activating oxide, and in the absence of activating metallic oxides.

18. A composition comprising a rubber vulcanized in the presence of the zinc salt of a 2-mercaptothiazoline, and in the presence of a fatty acid, and in the presence of no more than the stoichiometric amount of activating metallic oxides sufficient to react with the acidic constituents of the composition during its vulcanization.

PAUL C. JONES.